(12) United States Patent
Cho et al.

(10) Patent No.: US 8,592,528 B2
(45) Date of Patent: Nov. 26, 2013

(54) POLYMER, COMPOSITION AND FILM

(75) Inventors: Eunseog Cho, Seoul (KR); Youngsuk Jung, Suwon-si (KR); Sangmo Kim, Hwaseong-si (KR); Byung-Hee Sohn, Yongin-si (KR); Yooseong Yang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 246 days.

(21) Appl. No.: 12/875,467

(22) Filed: Sep. 3, 2010

(65) Prior Publication Data
US 2011/0196109 A1   Aug. 11, 2011

(30) Foreign Application Priority Data

Feb. 11, 2010   (KR) .................. 10-2010-0013062

(51) Int. Cl.
*C08L 77/06*   (2006.01)

(52) U.S. Cl.
USPC .......... 525/436; 525/420; 525/425; 525/431; 528/272; 528/332; 528/350; 528/353

(58) Field of Classification Search
USPC .......... 525/420, 425, 431, 436; 528/272, 332, 528/350, 353
See application file for complete search history.

(56) References Cited

U.S. PATENT DOCUMENTS

| 4,927,736 A * | 5/1990 | Mueller et al. ............. 430/275.1 |
| 2007/0106056 A1 * | 5/2007 | Itatani ........................... 528/310 |
| 2008/0274292 A1 * | 11/2008 | Shooshtari et al. ......... 427/389.8 |

FOREIGN PATENT DOCUMENTS

| JP | 08-323169 A | 12/1996 |
| WO | 2006080766 A1 | 8/2006 |

* cited by examiner

*Primary Examiner* — Robert Jones, Jr.
(74) *Attorney, Agent, or Firm* — Cantor Colburn LLP

(57) ABSTRACT

Polyamic acid including structural units of the following Chemical Formulae 1 and 2 is provided:

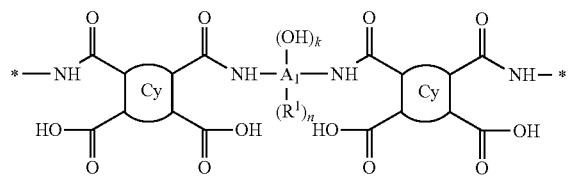

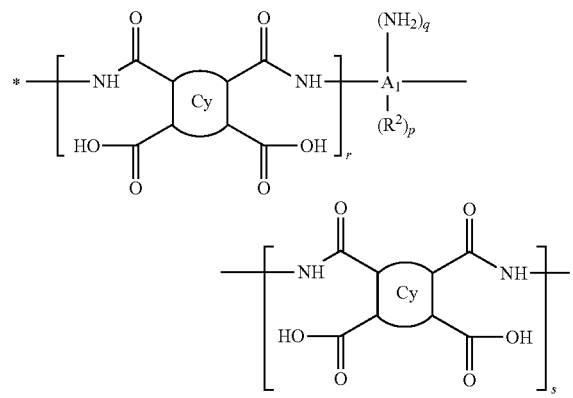

In Chemical Formulae 1 and 2, each substituent is as defined in the detailed description.

11 Claims, 4 Drawing Sheets

POLYMER, COMPOSITION AND FILM

CROSS-REFERENCE TO RELATED APPLICATION

This application claims priority to Korean Patent Application No. 10-2010-0013062 filed on Feb. 11, 2010, and all the benefits accruing therefrom under 35 U.S.C. §119, the content of which in its entirety is herein incorporated by reference.

BACKGROUND

1. Field

This disclosure relates to a polymer and a composition and a film comprising the same.

2. Description of the Related Art

As information technology advances and becomes more widely used, there is an increasing need for an ultralight flexible thin display that consumes a low amount of electrical power and can be used to visualize and deliver information. In a flexible display, the flexible substrate generally determines performance, reliability, and price of the display. Common substrates include plastic substrates, which typically are light and easy to work with in a continuous process.

Currently available plastic substrates suffer from some disadvantages, however, such as low thermal stability. For example, a common polyimide film may be easily discolored to yellow or brown due to heat degradation as a result of a severe thermal history or simply due to the polymer structure. Such discoloration is typically due to formation of a charge-transfer (CT) complex inside a polymer molecule of an electron-giving part, in which a nitrogen atom centers inside the polymer, and an electron-receiving part, in which a carbonyl group centers inside the polymer, and also to the formation of a CT complex between polymer molecules.

To satisfy the increasing need for flexible substrates, plastics with improved properties, such as a lower coefficient of thermal expansion ("CTE") and higher light transmission, are required. Accordingly, there is a need in the art for a polyimide polymer that exhibits improved thermal and optical transmission properties.

SUMMARY

An embodiment of this disclosure provides a polymer that exhibits improved thermal properties and optical transmission properties.

Other embodiments of this disclosure provide a composition and a film having excellent thermal properties and optical transmission properties.

According to one representative embodiment of this disclosure, a polyamic acid polymer is provided that includes at least one structural unit of the following Chemical Formula 1 and at least one structural unit of the following Chemical Formula 2.

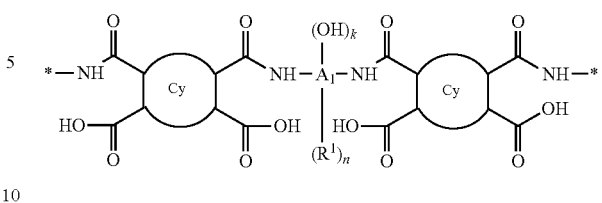

Chemical Formula 1

In Chemical Formula 1, each Cy is independently a substituted or unsubstituted $C_4$ to $C_{20}$ carbon cyclic group, a substituted or unsubstituted 5- to 20-membered aromatic group, a substituted or unsubstituted 8- to 20-membered condensed polycyclic aromatic group, a substituted or unsubstituted 10- to 20-membered non-condensed polycyclic aromatic group, or a group that contains two substituted or unsubstituted 8- to 20-membered non-condensed polycyclic aromatic groups that are linked to each other through a substituted or unsubstituted aromatic group, as illustrated below:

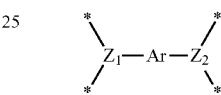

wherein Ar is a substituted or unsubstituted aromatic group (e.g., 5- to 20-membered), and $Z_1$ and $Z_2$ are independently chosen from 8- to 20-membered non-condensed polycyclic aromatic groups, $A_1$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^1$ is independently hydrogen, a hydroxyl group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, n is an integer ranging from 0 to about 3, and k is an integer ranging from 1 to the valence of $A_1$, such that n+k is equal to the valence of $A_1$, and each asterisk ("*") represents a point of attachment to an adjacent structural unit.

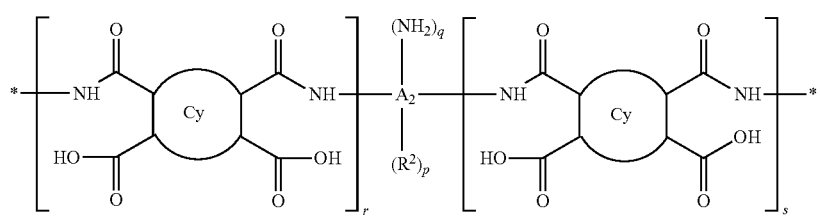

Chemical Formula 2

In Chemical Formula 2, each Cy is independently selected from the groups listed above for Cy in Chemical Formula 1, $A_2$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^2$ is independently hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ amine group, or a substituted or unsubstituted $C_1$ to $C_{15}$ alkylamine group, p and q are integers that independently range from 0 to about 3, r and s are integers that independently range from 0 to about 3, such that r+s ranges from 3 to 6, and p+q+r+s is equal to the valence of $A_2$, and each asterisk ("*") represents a point of attachment to an adjacent structural unit.

In certain embodiments, a polyamic acid polymer including structural units represented by Chemical Formulae 1 and 2 is imidized to provide a polyimide polymer. The polyimide may, within a representative embodiment, include structural units of the following Chemical Formulae 3 and 4.

Chemical Formula 3

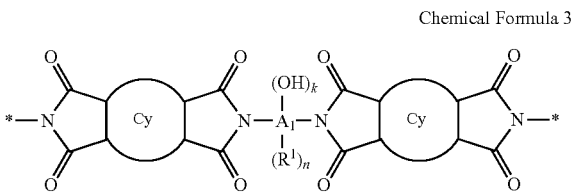

In Chemical Formula 3, Cy, $A_1$, $R^1$, n, and k are as defined in Chemical Formula 1 and each asterisk ("*") represents a point of attachment to an adjacent structural unit.

Chemical Formula 4

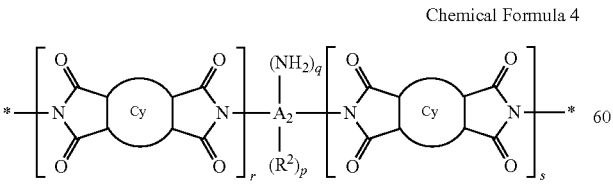

In Chemical Formula 4, Cy, $A_2$, $R^2$, p, q, r, and s are as defined in Chemical Formula 2 and each asterisk ("*") represents a point of attachment to an adjacent structural unit.

In a further representative embodiment of Chemical Formula 1, $A_1$ is represented by the following Chemical Formula 5.

Chemical Formula 5

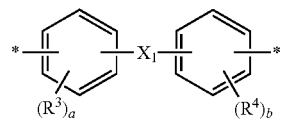

In Chemical Formula 5, $X_1$ is selected from a single bond, $(CRR')_n$ (where each R and R' is independently hydrogen, a hydroxy group, a $C_1$ to $C_{10}$ alkyl group, or a $C_1$ to $C_{10}$ fluoroalkyl group, and n is an integer ranging from 1 to about 5), $SO_2$, O, or CO, each $R^3$ and $R^4$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, provided that at least one of $R^3$ and $R^4$ is a hydroxy group, a and b are integers that independently range from 0 to about 3, such that a+b ranges from 1 to about 6, and each asterisk ("*") represents a point of attachment to an adjacent nitrogen in Chemical Formula 1.

In other representative embodiments, $A_1$ of Chemical Formula 1 may be represented by any one of the following Chemical Formulae 6.

Chemical Formulae 6

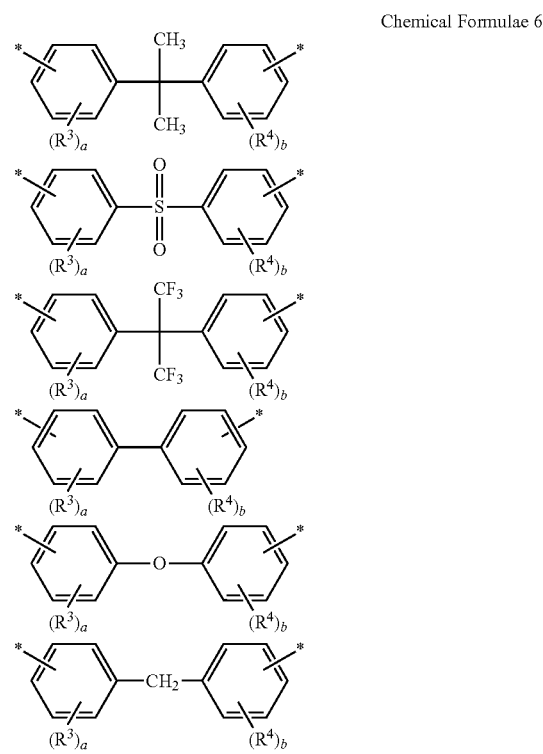

-continued

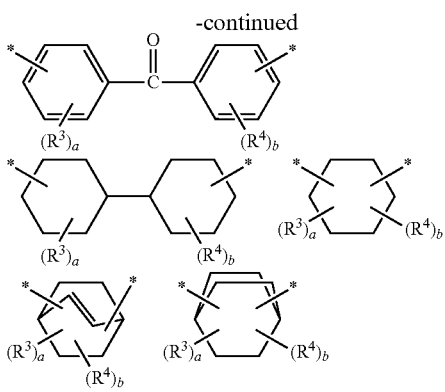

In Chemical Formulae 6,
each $R^3$, $R^4$, a, and b are as defined in Chemical Formula 5 and each asterisk ("*") represents a point of attachment to an adjacent nitrogen in Chemical Formula 1.

In certain representative embodiments of Chemical Formula 2, $A_2$ may be represented by the following Chemical Formula 7-1 or 7-2.

Chemical Formula 7-1

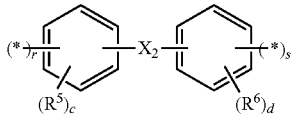

In Chemical Formula 7-1,
$X_2$ is a single bond, $(CRR')_n$ (where each R and R' is independently hydrogen, a hydroxy group, a $C_1$ to $C_{10}$ alkyl group, a $C_1$ to $C_{10}$ fluoroalkyl group, a $C_6$ to $C_{20}$ aryl group, or a $C_6$ to $C_{20}$ aryl group including an amine substituent, and n is an integer ranging from 1 to about 5), $SO_2$, O, or CO, each $R^5$ and $R^6$ is independently, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ alkylamine group, or a substituted or unsubstituted $C_6$ to $C_{20}$ arylamine group, c and d are integers that independently range from 0 to about 3, such that c+d ranges from 0 to about 6, r and s are integers that independently range from 0 to about 3, such that r+s ranges from 3 to 6, and each asterisk ("*") represents a point of attachment to an adjacent nitrogen in Chemical Formula 4.

Chemical Formula 7-2

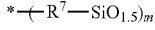

In Chemical Formula 7-2,
each R' is independently a single bond, a substituted or unsubstituted $C_1$ to $C_{15}$ alkylene group, a substituted or unsubstituted $C_1$ to $C_{15}$ alkoxylene group, a substituted or unsubstituted $C_1$ to $C_{15}$ fluoroalkylene group, a substituted or unsubstituted $C_3$ to $C_{15}$ cycloalkylene group, a substituted or unsubstituted 3- to 15-membered heterocycloalkylene group, a substituted or unsubstituted $C_3$ to $C_{15}$ cycloalkyleneoxy group, a substituted or unsubstituted $C_6$ to $C_{15}$ arylene group, a substituted or unsubstituted $C_6$ to $C_{15}$ aryleneoxy group, a substituted or unsubstituted 5- to 15-membered heteroarylene group, or —NR— (where R is hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group), m is an integer ranging from about 4 to about 12, and the asterisk ("*") represents a point of attachment of R' in Chemical Formula 2.

$A_2$ of Chemical Formula 2 may, in certain representative embodiments, be represented by any one of the following Chemical Formulae 8.

Chemical Formula 8

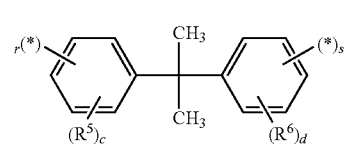
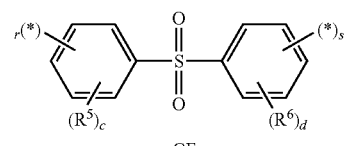
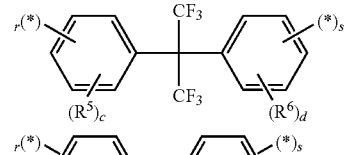
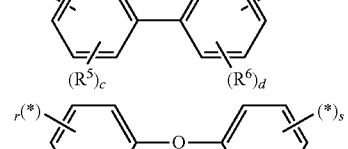
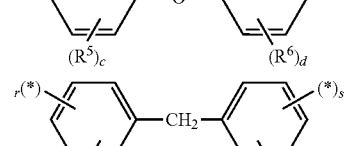
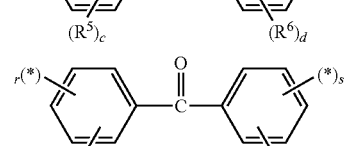
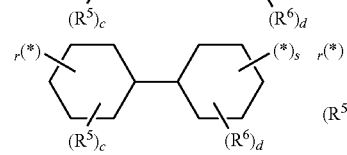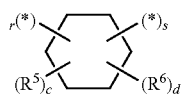

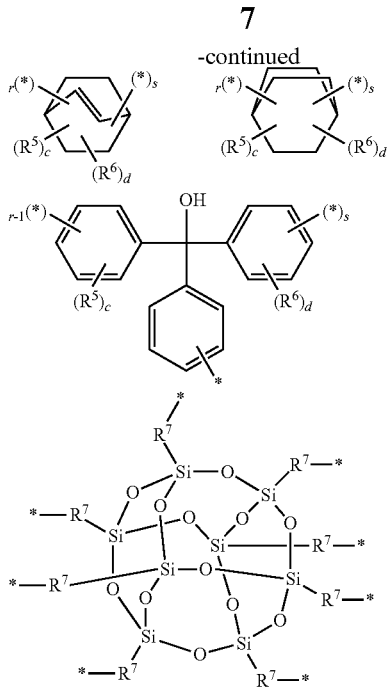

In Chemical Formulae 8, each $R^5$, $R^6$, c, d, r, s, and the asterisk ("*")—is independently as described in Chemical Formula 7-1, and each $R^7$ is independently as described in Chemical Formula 7-2.

In certain embodiments, a polyamic acid polymer may be obtained by reacting a hydroxy group-containing amine compound of Chemical Formula 9, an amine compound including at least three amine groups of Chemical Formula 10, and an acid anhydride compound of the following Chemical Formula 11, and a polyimide polymer may be obtained by imidizing the polyamic acid.

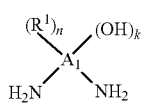

Chemical Formula 9

In Chemical Formula 9, $A_1$, $R^1$, n, and k are as described in Chemical Formula 1.

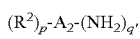

Chemical Formula 10

In Chemical Formula 10, $A_2$, $R^2$, and p are as described in Chemical Formula 2, and q' is 3 or more or 5 or more, and is the same as q+r+s of Chemical Formula 2.

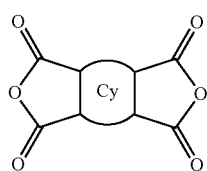

Chemical Formula 11

In Chemical Formula 11, Cy is as described in Chemical Formula 1.

In certain representative embodiments, the amine groups of the amine compounds of Chemical Formula 9 and Chemical Formula 10 and the acid dianhydride group of the acid dianhydride compound are reacted with each other at an equivalent ratio ranging from about 1:0.9 to about 1:1.1.

In further representative embodiments, the amine compounds of Chemical Formula 9 and Chemical Formula 10 are reacted at a mole ratio ranging from about 1:0.001 to about 1:0.5.

In still further representative embodiments, the amount of amine group of the amine compound of Chemical Formula 10 may be about 0.5 to about 50 mol % based on the total amount of the amine groups of the amine compounds of Chemical Formulae 9 and 10.

According to another embodiment of this disclosure, a composition including the polymer is provided.

According to another embodiment of this disclosure, a film including the polymer is provided.

Hereinafter, further aspects will be described in further detail.

DETAILED DESCRIPTION

Figure 1:
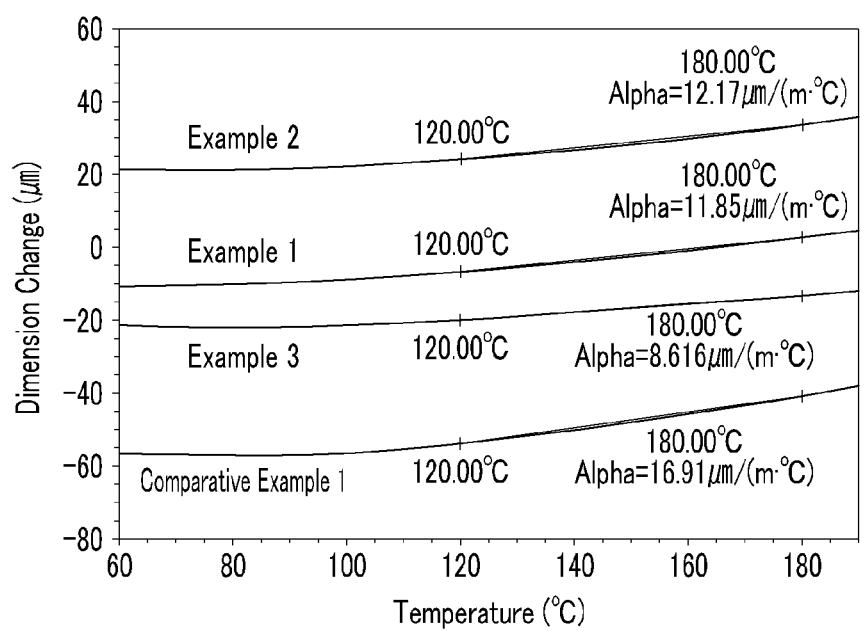
FIG. 1 is a graph illustrating dimensional change (μm) vs. temperature (° C.), and the resulting coefficients of thermal expansion ("CTE") of the representative polyimide films of Examples 1, 2 and 3, and the polyimide film of Comparative Example 1.

This disclosure will be described more fully hereinafter in the following detailed description of the invention, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs.

"Alkyl," as used herein, refers to a straight or branched chain saturated aliphatic hydrocarbon. Alkyl groups include, for example, groups having from 1 to 15 carbon atoms ($C_1$ to $C_{15}$ alkyl). "Alkenyl" is a straight or branched chain hydrocarbon that comprises at least one carbon-carbon double bond; and "alkynyl" refers to a straight or branched chain hydrocarbon that has one or more unsaturated carbon-carbon bonds, at least one of which is a triple bond.

"Fluoroalkyl" refers to an alkyl group in which at least one hydrogen is replaced with fluorine.

The term "cycloalkyl" refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups. Cycloalkyl groups do not comprise an aromatic ring or a heterocyclic ring.

The term "heterocycloalkyl" refers to a group that comprises one or more saturated and/or partially saturated rings in which at least one ring member is a non-carbon heteroatom, with remaining ring members being carbon. Heterocycloalkyl groups do not comprise an aromatic ring. In some instances, the total number of ring members (including both carbon atoms and heteroatoms) is indicated (e.g., a 3- to 15-membered or a 5- to 40-membered heterocycloalkyl). Heterocycloalkyl groups that comprise multiple rings may contain fused, pendant or spiro rings, and may further exhibit bridged or caged structures.

A "cycloalkyloxy" is a cycloalkyl group as described above that is linked via an oxygen (—O—) linker.

"Alkoxy," as used herein, refers to an alkyl moiety that is linked via an oxygen (i.e., —O-alkyl).

As used herein, a "$C_1$ to $C_{15}$ amine group" is a group of the formula —N($R_w$)($R_z$), wherein $R_w$ is a $C_1$ to $C_{15}$ alkyl, a $C_1$ to $C_{15}$ alkenyl, a $C_1$ to $C_{15}$ alkynyl, a $C_3$ to $C_{15}$ cycloalkyl or a $C_6$ to $C_{15}$ aryl; and $R_z$ is hydrogen or any of the groups listed for $R_w$, such that the total number of carbon atoms in $R_w$ and $R_z$ ranges from 1 to 15.

A "$C_1$ to $C_{15}$ alkylamine group" is a group of the formula -Q-N($R_w$)($R_z$), wherein Q is a $C_1$ to $C_{15}$ alkenylene, and $R_w$ and $R_z$ are independently hydrogen, a $C_1$ to $C_{14}$ alkyl, a $C_1$ to $C_{14}$ alkenyl, a $C_1$ to $C_{14}$ alkynyl, a $C_3$ to $C_{14}$ cycloalkyl or a $C_6$ to $C_{14}$ aryl; such that the total number of carbon atoms in Q, $R_w$ and $R_z$ ranges from 1 to 15.

"Aryl," as used herein refers to an aromatic moiety in which all ring atoms are carbon. Aryl groups may consist of one substituted or unsubstituted aromatic ring (e.g., phenyl) or may comprise multiple aromatic rings.

An "aryloxy" is an aryl group as described above that is linked via an oxygen (—O—) linker.

A "$C_6$ to $C_{20}$ arylamine group" is a group of the formula -Q-N($R_w$)($R_z$), wherein at least one of Q, $R_w$ and $R_z$ is an aryl group, with the other variables independently chosen from hydrogen, a $C_1$ to $C_{14}$ alkyl, a $C_1$ to $C_{14}$ alkenyl, a $C_1$ to $C_{14}$ alkynyl, a $C_3$ to $C_{14}$ cycloalkyl or a $C_6$ to $C_{14}$ aryl; such that the total number of carbon atoms in Q, $R_w$ and $R_z$ ranges from 6 to 20.

"Heteroaryl" refers to an aromatic moiety in which at least one ring member is a non-carbon heteroatom, and all remaining ring atoms are carbon. Heteroaryl groups may contain one substituted or unsubstituted aromatic ring or may comprise multiple aromatic rings. In some instances, the total number of ring members (including both carbon atoms and heteroatoms) is indicated (e.g., 5- to 15-membered heteroaryl).

"Aryloxy" refers to an aryl group that is linked via an oxygen (—O—) linker.

As used herein, the term "$C_4$ to $C_{20}$ carbon cyclic group" is a group that comprises a single or multiple rings containing a total of from 4 to 20 ring carbon atoms, and no non-carbon ring atoms. The rings can be aromatic or non-aromatic, or if multiple rings are present, both aromatic and non-aromatic rings may be included. If the carbon cyclic group comprises multiple rings, such rings may be fused, pendant or spiro. The carbon cyclic group may have one or more independently chosen substituents such as a halogen, a $C_1$ to $C_{20}$ haloalkyl group, a nitro group, a cyano group, a $C_1$ to $C_{20}$ alkoxy group, and a lower $C_1$ to $C_{10}$ alkylamino group.

The "$C_6$ to $C_{20}$ monocyclic aromatic group" indicates an aromatic group that comprises exactly one carbocyclic aromatic ring, and that may optionally comprise additional fused, pendant or spiro rings that are non-aromatic carbocycles or heterocycles, such that the total number of ring carbon atoms ranges from 6 to 20. The monocyclic aromatic group may have one or more independently chosen substituents such as a halogen, a $C_1$ to $C_{20}$ haloalkyl group, a nitro group, a cyano group, a $C_1$ to $C_{20}$ alkoxy group, and a lower $C_1$ to $C_{10}$ alkylamino group.

The "8- to 20-membered condensed polycyclic aromatic group" is a group that comprises at least two condensed aromatic rings, with optional additional aromatic or non-aromatic rings, wherein the rings comprise a total of from 8 to 20 ring members. All of the ring members may be carbon, or one or more ring members may be an independently chosen heteroatom. At least one of hydrogen atoms among condensed polycyclic aromatic groups may be replaced with a substituent independently chosen from groups such as a halogen, a $C_1$ to $C_{20}$ haloalkyl group, a nitro group, a cyano group, a $C_1$ to $C_{20}$ alkoxy group, and a lower $C_1$ to $C_{10}$ alkylamino group.

The "10- to 20-membered non-condensed polycyclic aromatic group" is a group that comprises at least two aromatic rings, with optional additional aromatic or non-aromatic rings, wherein the rings comprise a total of from 10 to 20 ring members, such that the aromatic rings are linked to one another directly or by a linker. All of the ring members may be carbon, or one or more ring members may be an independently chosen heteroatom. The linker may be a $C_1$ to $C_{10}$ alkylene group, a $C_1$ to $C_{10}$ alkyl group or a $C_1$ to $C_{10}$ alkylene group substituted with a $C_1$ to $C_{10}$ fluoroalkyl group, $SO_2$, CO, O, and the like. At least one hydrogen atom in a non-condensed polycyclic aromatic group may, but need not, be replaced with a substituent such as a halogen, $C_1$ to $C_{20}$ haloalkyl group, a nitro group, cyano group, a $C_1$ to $C_{20}$ alkoxy group, or a $C_1$ to $C_{10}$ lower alkylamino group.

A "8- to 20-membered non-condensed polycyclic aromatic group" is as described above for the 10- to 20-membered non-condensed polycyclic aromatic group, except that the minimum number of ring members is eight.

Throughout this disclosure, reference is made to various multivalent moieties (e.g., bivalent groups). Such moieties are typically indicated with the suffix "ene" and except for the difference in valence are the same as the monovalent groups that are similarly named. For example, an "alkylene" moiety is a multivalent alkyl group; and an "alkyleneoxy" moiety is a multivalent alkyl group in which one of the carbon atoms is replaced with an oxygen atom. A $C_6$ to $C_{15}$ arylene group is a multivalent linking group that has the same structure as a $C_6$ to $C_{15}$ aryl group, and a 5- to 15-membered heteroarylene group is a multivalent linking group having the same structure as a 5- to 15-membered heteroaryl group. The precise structure of other multivalent moieties will be apparent from the definitions of the monovalent groups and the above examples.

When a definition is not otherwise provided, the term "substituted" refers replacement of one or more hydrogens with one or more substituents (e.g., 1, 2, 3, 4, 5 or 6 substituents). In certain embodiments, the substituents are independently selected from a halogen, a hydroxy group, a $C_1$ to $C_{15}$ alkyl group, a $C_1$ to $C_{15}$ haloalkyl group (e.g., a $C_1$ to $C_{15}$ fluoroalkyl group), a nitro group, a cyano group, a $C_1$ to $C_{15}$ alkoxy group, a $C_3$ to $C_{15}$ cycloalkyl group, a 3- to 15-membered heterocycloalkyl group, a $C_3$ to $C_{15}$ cycloalkyloxy group, a $C_6$ to $C_{15}$ aryl group, a $C_6$ to $C_{15}$ aryloxy group, a 5- to 15-membered heteroaryl group, and a lower $C_1$ to $C_{10}$ alkylamino group.

As used herein, when a definition is not otherwise provided, the term "hetero" refers to a functional group including at least one (e.g., from 1 to 3, from 1 to 5, from 1 to 10 or from 1 to 20) heteroatoms independently selected from N, O, S, P, and Si.

According to an embodiment, a polyamic acid polymer including at least one structural unit of the following Chemical Formula 1 and at least one structural unit of the following Chemical Formula 2 is provided. In certain representative embodiments, the polyamic acid polymer comprises only structural units of Chemical Formula 1 and Chemical Formula 2 (i.e., all structural units satisfy either Chemical Formula 1 or Chemical Formula 2). In other representative embodiments, the polyamic acid polymer comprises a structural unit of Chemical Formula 1 and a structural unit of Chemical Formula 2, and may further comprise one or more structural units that satisfy neither Chemical Formula 1 nor Chemical Formula 2.

$A_1$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^1$ is independently hydrogen, a hydroxyl group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, n is an integer ranging from 0 to about 3, and k is an integer ranging from 1 to the valence of $A_1$, such that n+k is equal to the valence of $A_1$; and each asterisk ("*") represents a point of attachment to an adjacent structural unit.

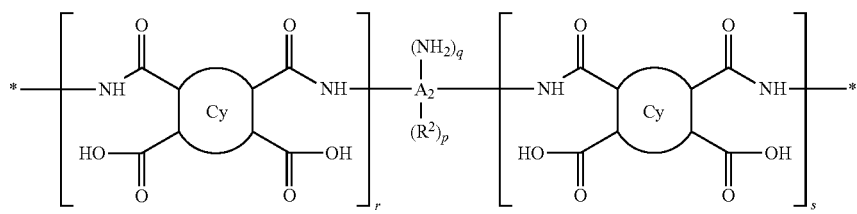

Chemical Formula 2

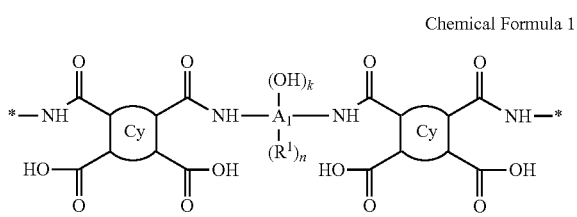

Chemical Formula 1

In Chemical Formula 1, each Cy is independently a substituted or unsubstituted $C_4$ to $C_{20}$ carbon cyclic group, a substituted or unsubstituted $C_6$ to $C_{20}$ monocyclic aromatic group, a substituted or unsubstituted 8- to 20-membered condensed polycyclic aromatic group, a substituted or unsubstituted 10- to 20-membered non-condensed polycyclic aromatic group, or a group that contains two substituted or unsubstituted 8- to 20-membered non-condensed polycyclic aromatic groups that are linked to each other through a substituted or unsubstituted aromatic group, as illustrated below:

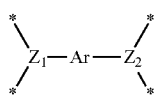

wherein Ar is a substituted or unsubstituted aromatic group (e.g., 5- to 20-membered), and $Z_1$ and $Z_2$ are independently chosen from 8- to 20-membered non-condensed polycyclic aromatic groups as defined above, In Chemical Formula 2, each Cy is independently selected from the groups listed above for Cy in Chemical Formula 1, $A_2$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^2$ is independently hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ amine group, or a substituted or unsubstituted $C_1$ to $C_{15}$ alkylamine group, p and q are integers that independently range from 0 to about 3, r and s are integers that independently range from 0 to about 3, such that r+s ranges from 3 to 6, and p+q+r+s is equal to the valence of $A_2$; and each asterisk ("*") represents a point of attachment to an adjacent structural unit.

In certain embodiments, a polyamic acid polymer including structural units represented by Chemical Formulae 1 and 2 is imidized to provide a polyimide. Such a polyimide may include at least one structural unit of the following Chemical Formula 3 and at least one structural unit of the following Chemical Formula 4.

Chemical Formula 3

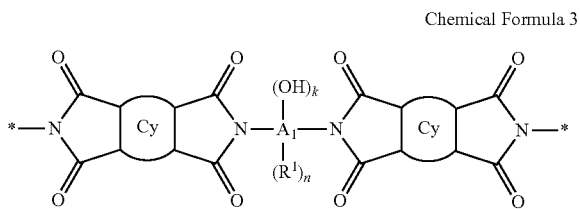

In Chemical Formula 3, Cy, $A_1$, $R^1$, n, and k are as defined in Chemical Formula 1 and each asterisk ("*") represents a point of attachment to an adjacent structural unit.

Chemical Formula 4

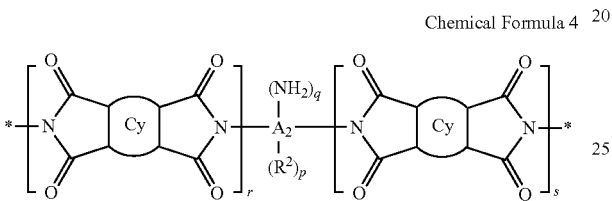

In Chemical Formula 4, Cy, $A_2$, $R^2$, p, q, r, and s are as defined in Chemical Formula 2 and each asterisk ("*") represents a point of attachment to an adjacent structural unit.

Without wishing to be bound by any particular theory, it is believed that the polyamic acid and polyimide polymers provided herein exhibit improved thermal stability by virtue of hydrogen bonds involving hydroxy groups in Chemical Formula 1 or Chemical Formula 3, and also have improved thermal properties due to the presence of a cross-linking structure involving units of Chemical Formula 2 or Chemical Formula 4.

In a representative embodiment of Chemical Formula 1, $A_1$ may be represented by the following Chemical Formula 5.

Chemical Formula 5

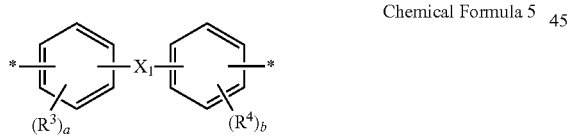

In Chemical Formula 5, $X_1$ is selected from a single bond, $(CRR')_n$ (where each R and R' is independently hydrogen, a hydroxy group, a $C_1$ to $C_{10}$ alkyl group, or a $C_1$ to $C_{10}$ fluoroalkyl group, and n is an integer ranging from 1 to about 5), $SO_2$, O, or CO, each $R^3$ and $R^4$ is independently, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, provided that at least one of $R^3$ and $R^4$ is a hydroxy group, a and b are integers that independently range from 0 to about 3, such that a+b ranges from 1 to about 6, and each asterisk ("*") represents a point of attachment to an adjacent nitrogen in Chemical Formula 1.

In certain representative embodiments, $R^3$ and $R^4$ of Chemical Formula 5 may be $R^1$ of Chemical Formula 1 or OH.

Representative examples of $A_1$ in Chemical Formula 1 are depicted in the following Chemical Formulae 6.

Chemical Formulae 6

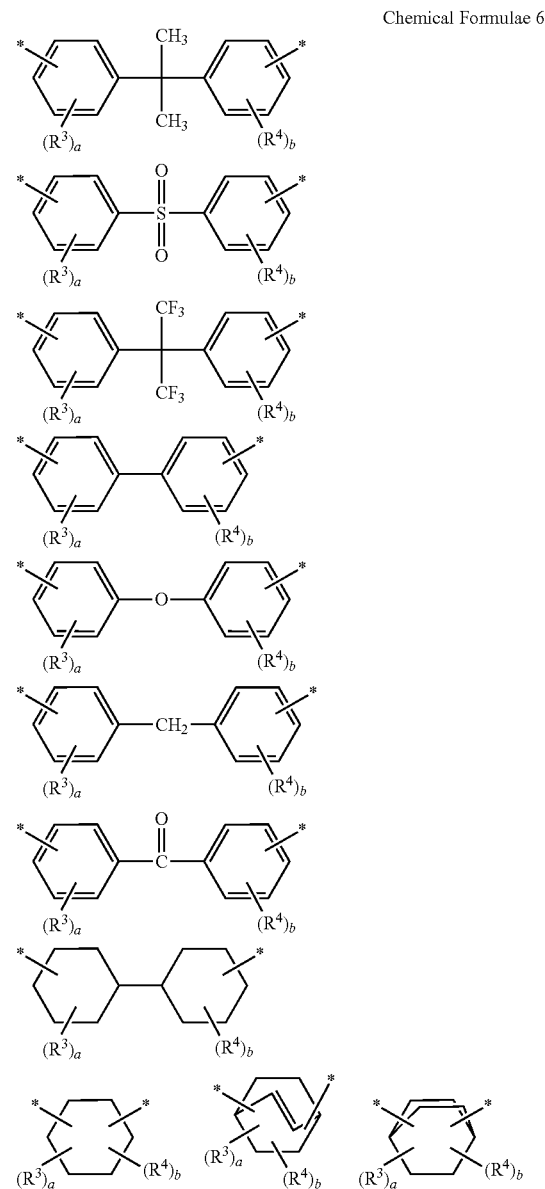

In Chemical Formulae 6, each $R^3$, $R^4$, a, and b are the same as in Chemical Formula 5 and each asterisk ("*") represents a point of attachment to an adjacent nitrogen in Chemical Formula 1.

In certain representative embodiments of Chemical Formula 2, $A_2$ may be represented by the following Chemical Formula 7-1 or 7-2.

Chemical Formula 7-1

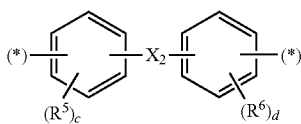

In Chemical Formula 7-1, $X_2$ is a single bond, $(CRR')_n$ (where each R and R' is independently hydrogen, a hydroxy group, a $C_1$ to $C_{10}$ alkyl group, a $C_1$ to $C_{10}$ fluoroalkyl group, a $C_6$ to $C_{20}$ aryl group, or a $C_6$ to $C_{20}$ aryl group including an amine substituent, and n is an integer ranging from 1 to about 5), $SO_2$, O, or CO, each $R^5$ and $R^6$ is independently, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ alkylamine group, or a substituted or unsubstituted $C_6$ to $C_{20}$ arylamine group, c and d are integers that independently range from 0 to about 3, such that c+f ranges from 0 to about 6, r and s are integers that independently range from 0 to about 3, such that r+s ranges from 3 to 6, and each asterisk ("*") represents a point of attachment to an adjacent nitrogen in Chemical Formula 2.

In certain representative embodiments, $R^5$ and $R^6$ of Chemical Formula 7-1 may be $R^2$ of Chemical Formula 2 or $NH_2$.

Chemical Formula 7-2

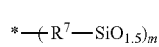

In Chemical Formula 7-2, each R' is independently a single bond, a substituted or unsubstituted $C_1$ to $C_{15}$ alkylene group, a substituted or unsubstituted $C_1$ to $C_{15}$ alkoxylene group, a substituted or unsubstituted $C_1$ to $C_{15}$ fluoroalkylene group, a substituted or unsubstituted $C_3$ to $C_{15}$ cycloalkylene group, a substituted or unsubstituted 3- to 15-membered heterocycloalkylene group, a substituted or unsubstituted $C_3$ to $C_{15}$ cycloalkyleneoxy group, a substituted or unsubstituted $C_6$ to $C_{15}$ arylene group, a substituted or unsubstituted $C_6$ to $C_{15}$ aryleneoxy group, a substituted or unsubstituted 5- to 15-membered heteroarylene group, or —NR— (where R is hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group), m is an integer ranging from about 4 to about 12, and the asterisk ("*") represents a point of attachment of R' to an adjacent moiety in Chemical Formula 2.

In certain embodiments, one or more R' of Chemical Formula 7-2 is attached to a group represented by $R^2$ of Chemical Formula 2 or $NH_2$.

In Chemical Formula 7-2, m is generally an integer ranging from about 4 to about 12. When m is 4, Chemical Formula 7-2 provides a random structure including siloxane bonds, when m is 6, Chemical Formula 7-2 provides a partial cage structure, and when m is 8 or more, Chemical Formula 7-2 provides a cage structure.

Representative examples of $A_2$ in Chemical Formula 2 are depicted in the following Chemical Formula 8.

Chemical Formula 8

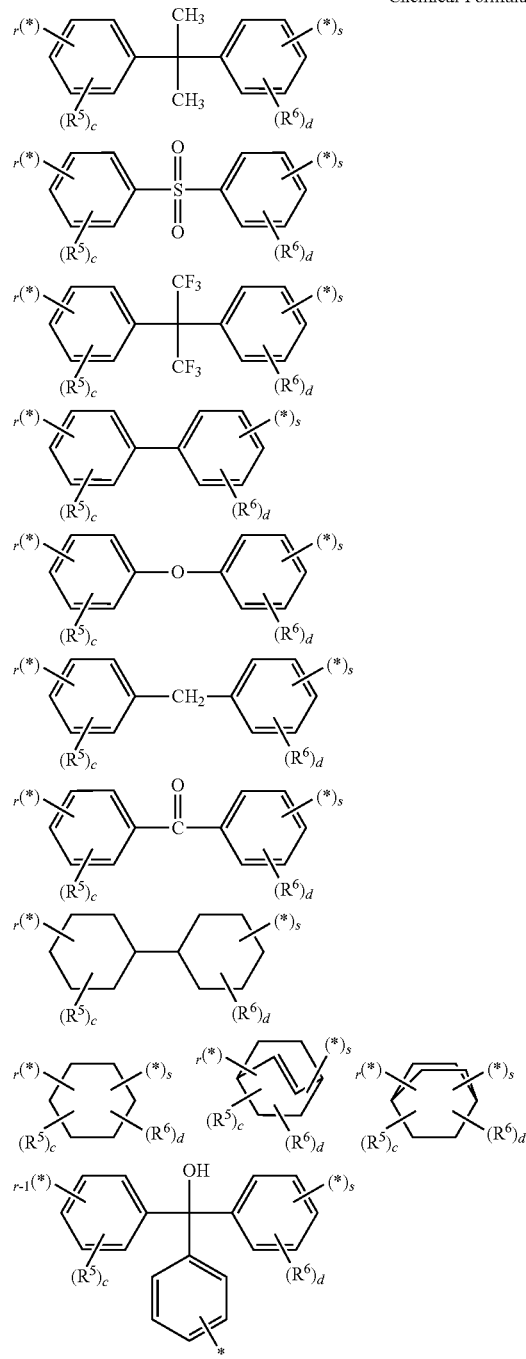

-continued

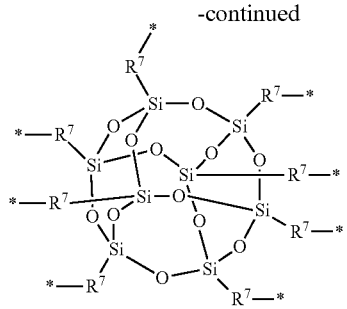

In Chemical Formula 8,
each $R^5$, $R^6$, c, d, r, s, and the asterisk ("*") are independently as described in Chemical Formula 7-1, each $R^7$ is independently as described in Chemical Formula 7-2. In certain embodiments, a polyamic acid polymer is obtained by reacting a hydroxy group-containing amine compound of Chemical Formula 9, an amine compound including at least three amine groups of Chemical Formula 10, and an acid dianhydride compound of the following Chemical Formula 11 in an organic solvent. The polyimide polymer may then be obtained by imidizing the polyamic acid.

Chemical Formula 9

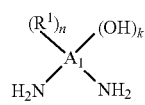

In Chemical Formula 9,
$A_1$, $R^1$, n, and k are as defined in Chemical Formula 1.

Chemical Formula 10

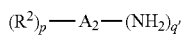

In Chemical Formula 10,
$A_2$, $R^2$, and p are as defined in Chemical Formula 2, and q' is 3 or more or 5 or more, and is the same as q+r+s in Chemical Formula 2.

Chemical Formula 11

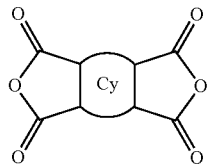

Cy of Chemical Formula 11 is as defined in Chemical Formula 1.

Examples of the acid dianhydride compound include 4,4-biphthalic anhydride ("BPDA"), 3,3',4,4'-diphenylsulfone tetracarboxylic dianhydride ("DSDA"), 3,3',4,4'-benzophenonetetracarboxylic dianhydride ("BTDA"), 4,4'-(hexafluoroisopropylidene)diphthalic anhydride ("6FDA"), 4,4'-oxydiphthalic anhydride ("ODPA"), pyromellitic dianhydride ("PMDA"), 4-(2,5-dioxotetrahydrofuran-3-yl)-1,2,3,4-tetrahydronaphthalene-1,2-dicarboxylic anhydride ("DTDA"), and the like. These may be used singularly or in a mixture of two or more. These representative acid dianhydrides have a structure as illustrated in the following Chemical Formulae 11-1.

Chemical Formulae 11-1

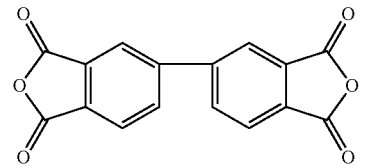
BPDA

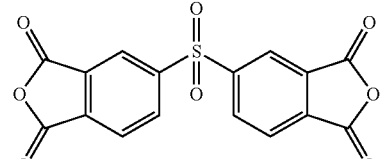
DSDA

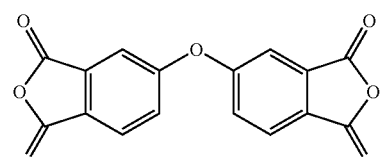
BTDA

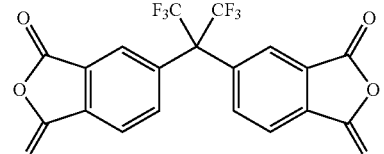
6FDA

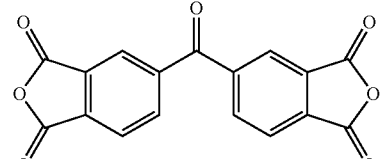
ODPA

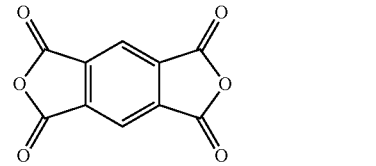
PMDA

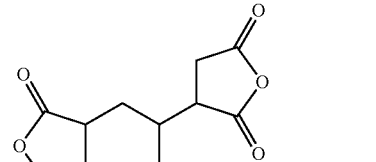
DTDA

Representative organic solvents include N-methylpyrrolidone, N,N-dimethyl formamide, N,N-diethyl formamide, N,N-dimethyl acetamide, N-methylcaprolactam, N-methyl propionamide, dimethylsulfoxide, pyridine, tetrahydrofuran, cyclohexanone, 1,4-dioxane, and other polar aprotic solvents.

Such solvents may be used singularly or in a mixture of two or more.

In certain representative embodiments, the amine groups of the amine compounds of Chemical Formula 9 and Chemical Formula 10 and the acid dianhydride group of the acid dianhydride compound are reacted with each other at an equivalent ratio of about 1:0.9 to about 1:1.1. When the amine groups of the amine compounds of Chemical Formula 9 and Chemical Formula 10 and the acid dianhydride group of the acid dianhydride compound are used within the above range, the resulting polyamic acid and polyimide polymers have improved thermal stability. Without wishing to be bound by any particular theory, it is believed that this improved stability is the result of hydrogen bonding by hydroxy groups.

In further representative embodiments, the amine compounds of Chemical Formulae 9 and 10 are reacted at a mole ratio of about 1:0.001 to about 1:0.5. In still further representative embodiments, the amount of the amine group of the amine compound of Chemical Formula 10 may about 0.5 mol % to about 50 mol % based on the total amount of the amine groups of the amine compounds of Chemical Formulae 9 and 10. When the amounts of the amine compound of Chemical Formulae 9 and 10 or the amounts of the amine group are within the above range, the resultant polyamic acid and polyimide has improved properties and gelation is suppressed so that a substrate may be easily fabricated.

If desired, the reaction of the amine compound of Chemical Formulae 9 and 10 and the acid dianhydride compound of Chemical Formula 11 may be performed without a catalyst, resulting in improved transparency of a substrate generated therefrom.

According to another representative embodiment, a composition including the polymer is provided.

The composition may include a solvent to improve coating capability. Examples of solvents include dimethyl sulfoxide; N-methyl-2-pyrrolidone; N,N-dimethyl formamide ("DMF"); N,N-dimethyl acetamide ("DMAc"); N-methylformamide ("NMF"); alcohols such as methanol, ethanol, 2-methyl-1-butanol, or 2-methyl-2-butanol; a ketone such as γ-butyrolactone, cyclohexanone, 3-hexanone, 3-heptanone, 3-octanone, acetone, or methyl ethyl ketone; tetrahydrofuran; trichloroethane; or a combination thereof, but are not limited thereto.

The polyamic acid or polyimide polymer can be thermally stabilized through hydrogen bonds by hydroxy groups, and also has improved mechanical properties by a cross-linking structure. Thus the polyamic acid or polyimide polymer can provide a film having both excellent thermal properties and optical transmission properties.

In certain representative embodiments, the film has a coefficient of thermal expansion of about 3 ppm/° C. to about 100 ppm/° C. When the coefficient of thermal expansion is within this range, thermal properties of a film may be improved.

The film may be applied to a substrate such as, but not limited to, a substrate for a device, an optical film, an integrated circuit ("IC") package, an adhesive film, a multi-layer flexible printed circuit ("FPC"), or a tape.

Hereinafter, the embodiments are illustrated in more detail with reference to examples. However, the following are exemplary embodiments and are not limiting.

Example 1

19.6 mmol of 3,3'-dihydroxybenzidine ("DHBZ"), 0.2 mmol of 3,3'-diaminobenzidine ("DABZ"), and 20.0 mmol of 3,3',4,4-biphenyltetracarboxylic dianhydride ("BPDA") are mixed in a 500 mL round-bottomed flask and reacted in the presence of DMAc for 15 hours to obtain polyamic acid. The amount of the amine group of DABZ is 2 mol % based on the total amount of the amine groups of DHBZ and DABZ.

The polyamic acid is applied to glass substrates treated with octyltrichlorosilane, undergoes $N_2$ purging at about 50° C. for about 1 hour, is allowed to stand under vacuum at about 80° C. for about 1 hour, and the temperature thereof is then increased to about 250° C. at a speed of about 1° C. per minute. Subsequently, heat treatment is performed under a nitrogen ($N_2$) atmosphere for about 1 hour to thereby fabricate the cross-linked polyimide film.

Example 2

19.6 mmol of DHBZ, 0.1 mmol of octa(aminophenyl)silsesquioxane ("OAPS"), and 20.0 mmol of BPDA are reacted for 15 hours in DMAc to obtain polyamic acid. The amount of the amine group of DABZ is 2 mol % based on the total amount of the amine groups of DHBZ and OAPS.

Using the polyamic acid, a cross-linked polyimide film is fabricated according to the same method as in Example 1.

Example 3

19.0 mmol of DHBZ, 0.25 mmol of OAPS, and 20.0 mmol of BPDA are mixed in a 500 mL round-bottomed flask and reacted in the presence of DMAc for 15 hours to obtain polyamic acid. The amount of the amine group of DABZ is 5 mol % based on the total amount of the amine groups of DHBZ and OAPS.

Using the polyamic acid, a cross-linked polyimide film is fabricated according to the same method as in Example 1.

Comparative Example 1

20 mmol of DHBZ and 20 mmol of BPDA are reacted for 15 hours in DMAc to obtain polyamic acid.

Using the polyamic acid, a cross-linked polyimide film is fabricated according to the same method as in Example 1.

Thermal Properties

Coefficients of thermal expansion ("CTE") of the polyimide films according to Examples 1, 2, and 3 and Comparative Example 1 are measured using a thermomechanical analyzer (5° C./min, Pre-load: 10 mN, TA Instrument TMA 2940). The results are shown in FIG. 1. As shown in FIG. 1, CTEs of the polyimide films according to Examples 1, 2, and 3 are 11.9 ppm/° C., 12.2 ppm/° C., and 8.6 ppm/° C., while the CTE of the polyimide film according to Comparative Example 1 is 16.9 ppm/° C.

Optical Properties

To evaluate the optical properties of the films fabricated according to Examples 1, 2, and 6 and Comparative Example 1, light transmittance and haze are measured with a KONICA MINOLTA spectrophotometer. The measurement results are as shown in the following Table 1.

TABLE 1

|  | Light transmittance (%) | Haze |
| --- | --- | --- |
| Example 1 | 78 | 0.43 |
| Example 2 | 78 | 0.84 |
| Example 3 | 80 | 0.41 |
| Comparative Example 1 | 68 | 1.21 |

As shown in Table 1, the polyimide films according to Examples 1, 2, and 3 show improved light transmittance and haze compared to that of Comparative Example 1.

Glass Transition Temperature

Figure 2A:
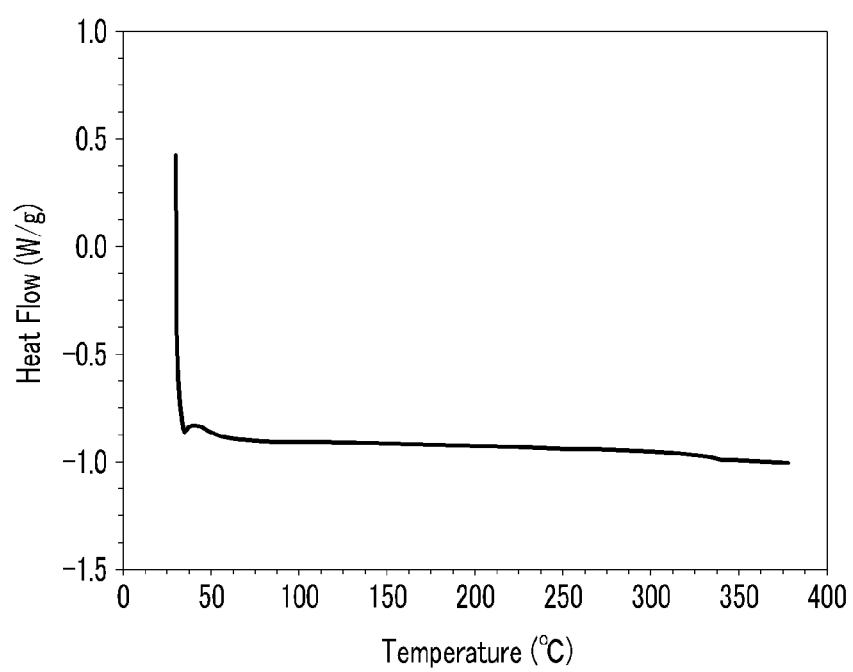
FIGS. 2A to 2C are graphs presenting the results (depicted as heat flow (W/g) vs. temperature (° C.)) of Differential Scanning calorimetry ("DSC") analysis of the representative polyimide films according to Examples 1 and 2 and Comparative Example 1.
Figure 2B:
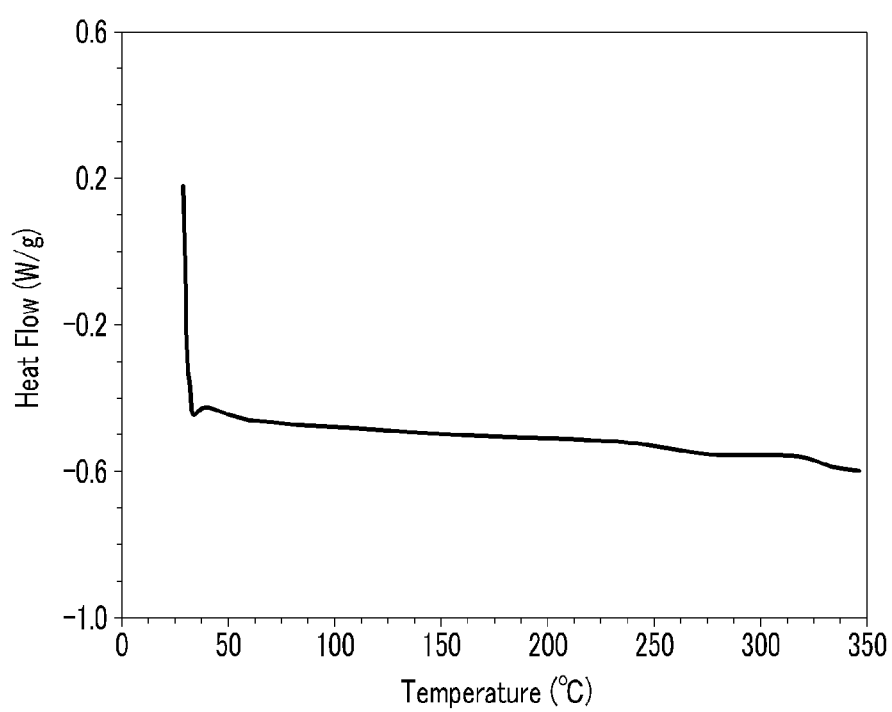
Figure 2C:
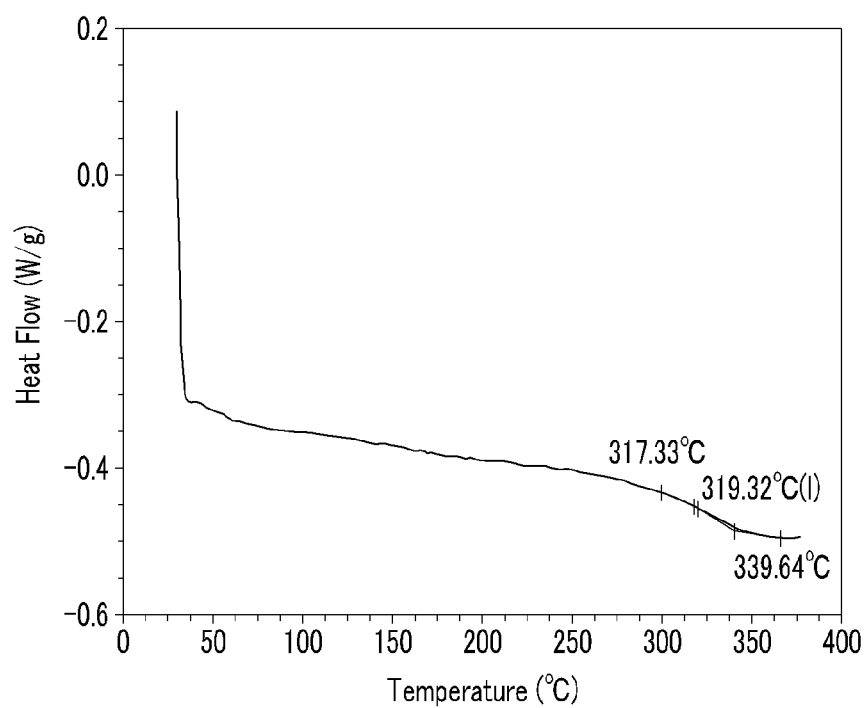

The polyimide films according to Examples 1 to 3 and Comparative Example 1 are evaluated with respect to glass transition temperature using differential scanning calorimetry ("DSC") with a heating rate of 10° C./minute, and decomposition temperature ("$T_{d5}$") using thermogravimetric analysis ("TGA"). The results are shown in the following Table 2. The decomposition temperature ("$T_{d5}$") refers to a temperature at which 5 wt % of the polymer is decomposed. DSC analysis results of polyimide films according to Examples 1 and 2 and Comparative Example 1 are shown in FIGS. 2A to 2C, respectively.

TABLE 2

| Polyimide film | $T_g$ (° C.) | $T_{d5}$ (° C.) |
| --- | --- | --- |
| Example 1 | ND | 416 |
| Example 2 | ND | 415 |
| Example 3 | ND | 423 |
| Comparative Example 1 | 319 | 402 |

In Table 2, ND refers to not being capable of being measured. As shown in FIGS. 2A to 2C and Table 2, the glass transition temperature ($T_g$) of the polyimide film according to Comparative Example 1 is 319° C., while the glass transition temperature ($T_g$) of the polyimide film according to Examples 1 to 3 increase without peaks in the analysis. Decomposition temperatures of the polyimide films according to Examples 1 to 3 are 416, 415, and 423° C., while that of Comparative Example 1 is 402° C. The results show that the polyimide films according to Examples 1 to 3 have thermal stability compared with that of Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyimide polymer comprising structural units of the following Chemical Formulae 3 and 4:

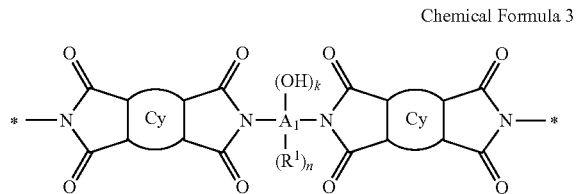

Chemical Formula 3 wherein, in Chemical Formula 3,
each Cy is independently a substituted or unsubstituted $C_4$ to $C_{20}$ carbon cyclic group, a substituted or unsubstituted $C_6$ to $C_{20}$ monocyclic aromatic group, a substituted or unsubstituted 8- to 20-membered condensed polycyclic aromatic group, or a substituted or unsubstituted 10- to 20-membered non-condensed polycyclic aromatic group, $A_1$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^1$ is independently hydrogen, a hydroxyl group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, n is an integer ranging from 0 to about 3, and k is an integer ranging from 1 to the valence of $A_1$, such that n+k is equal to the valence of $A_1$, and each asterisk ("*") represents a point of attachment to an adjacent structural unit,

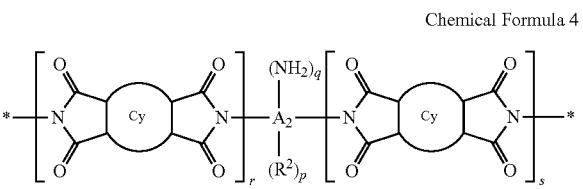

Chemical Formula 4 wherein, in Chemical Formula 4,
each Cy is independently a substituted or unsubstituted $C_4$ to $C_{20}$ carbon cyclic group, a substituted or unsubstituted $C_6$ to $C_{20}$ monocyclic aromatic group, a substituted or unsubstituted 8- to 20-membered condensed polycyclic aromatic group, or a substituted or unsubstituted 10- to 20-membered non-condensed polycyclic aromatic group, $A_2$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^2$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ amine group, or a substituted or unsubstituted $C_1$ to $C_{15}$ alkylamine group, p and q are integers that independently range from 0 to about 3, r and s are integers that independently range from 0 to about 3, such that r+s ranges from 3 to 6, and p+q+r+s is equal to the valence of $A_2$ minus the number of hydrogens attached to A2, and each asterisk ("*") represents a point of attachment to an adjacent structural unit, wherein a mole ratio between the structural unit of Chemical Formula 3 and the structural unit of Chemical Formula 4 is about 99.5:0.5 to about 90:10.

2. The polyimide polymer of claim 1, wherein $A_1$ in Chemical Formula 3 is represented by the following Chemical Formula 5:

Chemical Formula 5

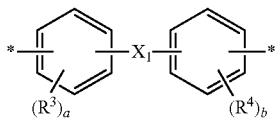

wherein, in Chemical Formula 5, $X_1$ is selected from a single bond, $(CRR')_n$ (where each R and R' is independently hydrogen, a hydroxy group, a $C_1$ to $C_{10}$ alkyl group, or a $C_1$ to $C_{10}$ fluoroalkyl group, and n is an integer ranging from 1 to about 5), $SO_2$, O, or CO, each $R^3$ and $R^4$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, provided that at least one of $R^3$ and $R^4$ is a hydroxy group, a and b are integers that independently range from 0 to about 3, such that a+b ranges from 1 to about 6, and each asterisk ("*") represents a point of attachment to an adjacent nitrogen in Chemical Formula 3.

3. The polyimide polymer of claim 1, wherein $A_1$ in Chemical Formula 3 is represented by any one of the following Chemical Formula 6:

Chemical Formulae 6

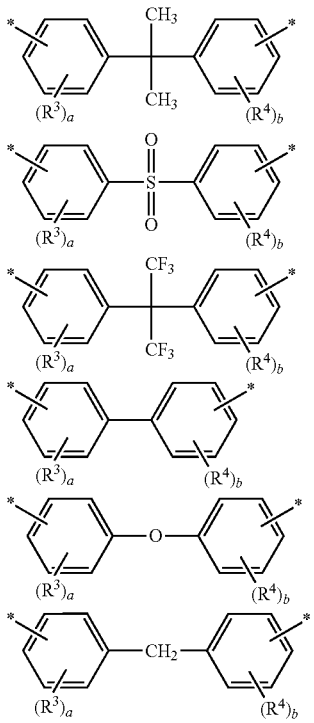

-continued

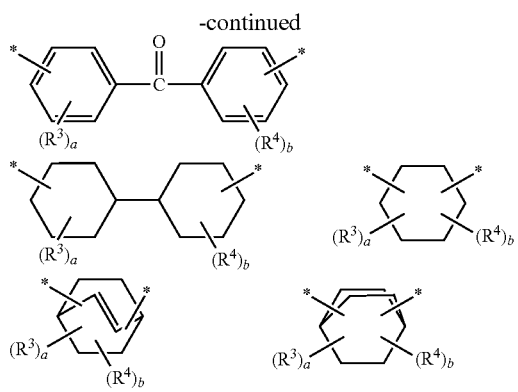

wherein, in Chemical Formula 6, each $R^3$ and $R^4$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, provided that at least one of $R^3$ and $R^4$ is a hydroxy group, and a and b are integers that independently range from 0 to about 3, such that a+b ranges from 1 to about 6.

4. The polyimide polymer of claim 1, wherein $A_2$ in Chemical Formula 4 is represented by the following Chemical Formula 7-1 or 7-2:

Chemical Formula 7-1

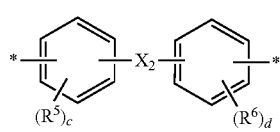

wherein, in Chemical Formula 7-1, $X_2$ is a single bond, $(CRR')_n$ (where each R and R' is independently hydrogen, a hydroxy group, a $C_1$ to $C_{10}$ alkyl group, a $C_1$ to $C_{10}$ fluoroalkyl group, a $C_6$ to $C_{20}$ aryl group, or a $C_6$ to $C_{20}$ aryl group including an amine substituent, and n is an integer ranging from 1 to about 5), $SO_2$, O, or CO, each $R^5$ and $R^6$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ alkylamine group, or a substituted or unsubstituted $C_6$ to $C_{20}$ arylamine group, c and d are integers that independently range from 0 to about 3, such that c+d ranges from 0 to about 6, r and s are integers that independently range from 0 to about 3, such that r+s ranges from 3 to about 6, and each asterisk ("*") represents a point of attachment to an adjacent nitrogen in Chemical Formula 4, Chemical Formula 7-2

$$*\!-\!(\!R^7\!-\!SiO_{1.5})_m$$

wherein, in Chemical Formula 7-2, each $R^7$ is independently a single bond, a substituted or unsubstituted $C_1$ to $C_{15}$ alkylene group, a substituted or unsubstituted $C_1$ to $C_{15}$ alkoxylene group, a substituted or unsubstituted $C_1$ to $C_{15}$ fluoroalkylene group, a substituted or unsubstituted $C_3$ to $C_{15}$ cycloalkylene group, a substituted or unsubstituted 3- to 15-membered heterocycloalkylene group, a substituted or unsubstituted $C_3$ to $C_{15}$ cycloalkyleneoxy group, a substituted or unsubstituted $C_6$ to $C_{15}$ arylene group, a substituted or unsubstituted $C_6$ to $C_{15}$ aryleneoxy group, a substituted or unsubstituted 5- to 15-membered heteroarylene group, or —NR— (where R is hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group), m is an integer ranging from about 4 to about 12, and the asterisk ("*") represents a point of attachment in Chemical Formula 4.

5. The polyimide polymer of claim 1, wherein $A_2$ in Chemical Formula 4 is represented by any one of the following Chemical Formula 8:

Chemical Formulae 8

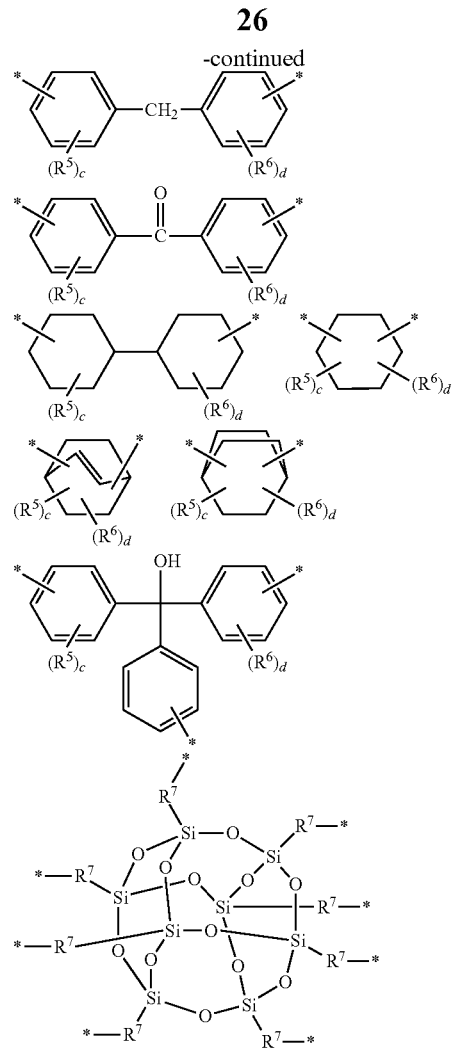

wherein in Chemical Formula 8, each $R^5$ and $R^6$ is independently a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ alkylamine group, or a substituted or unsubstituted $C_6$ to $C_{20}$ arylamine group, c and d are integers that independently range from 0 to about 3, such that c+d ranges from 0 to about 6, r and s are integers that independently range from 0 to about 3, such that r+s ranges from 3 to about 6, each $R^7$ is independently a single bond, a substituted or unsubstituted $C_1$ to $C_{15}$ alkylene group, a substituted or unsubstituted $C_1$ to $C_{15}$ alkoxylene group, a substituted or unsubstituted $C_1$ to $C_{15}$ fluoroalkylene group, a substituted or unsubstituted $C_3$ to $C_{15}$ cycloalkylene group, a substituted or unsubstituted 3- to 15-membered heterocycloalkylene group, a substituted or unsubstituted $C_3$ to $C_{15}$ cycloalkyleneoxy group, a substituted or unsubstituted $C_6$ to $C_{15}$ arylene group, a substituted or unsubstituted $C_6$ to $C_{15}$ aryleneoxy group, a substituted or unsubstituted 5- to 15-membered heteroarylene group, or —NR— (where R is hydrogen, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group), and each asterisk ("*") represents a point of attachment to an adjacent nitrogen in Chemical Formula 4.

6. A method of preparing a polyimide, comprising reacting a hydroxy group-containing amine compound of Chemical Formula 9, an amine compound including at least three amine groups of Chemical Formula 10, and an acid anhydride compound of the following Chemical Formula 11 to obtain a polyamic acid, and imidizing the polyamic acid to prepare the polyimide according to claim 1:

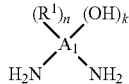

Chemical Formula 9 wherein, in Chemical Formula 9, $A_1$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^1$ is independently hydrogen, a hydroxyl group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, or a substituted or unsubstituted 5- to 15-membered heteroaryl group, n is an integer ranging from 0 to about 3, and k is an integer ranging from 1 to the valence of $A_1$, such that n+k is equal to the valence of $A_1$,

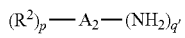

Chemical Formula 10 wherein, in Chemical Formula 10, $A_2$ is a substituted or unsubstituted $C_1$ to $C_{20}$ alkylene group, a substituted or unsubstituted $C_6$ to $C_{40}$ arylene group, a substituted or unsubstituted 5- to 40-membered heteroarylene group, a substituted or unsubstituted $C_5$ to $C_{40}$ cycloalkylene group, or a substituted or unsubstituted 5- to 40-membered heterocycloalkylene group, each $R^2$ is independently, a hydroxy group, a substituted or unsubstituted $C_1$ to $C_{15}$ alkyl group, a substituted or unsubstituted $C_1$ to $C_{15}$ alkoxy group, a substituted or unsubstituted $C_1$ to $C_{15}$ fluoroalkyl group, a substituted or unsubstituted $C_3$ to $C_{15}$ cycloalkyl group, a substituted or unsubstituted 3- to 15-membered heterocycloalkyl group, a substituted or unsubstituted $C_3$ to $C_{15}$ cycloalkyloxy group, a substituted or unsubstituted $C_6$ to $C_{15}$ aryl group, a substituted or unsubstituted $C_6$ to $C_{15}$ aryloxy group, a substituted or unsubstituted 5- to 15-membered heteroaryl group, $NH_2$, a substituted or unsubstituted $C_1$ to $C_{15}$ amine group, or a substituted or unsubstituted $C_1$ to $C_{15}$ alkylamine group, p ranges from 0 to about 3, and q' is 3 or more, and is the same as q+r+s in Chemical Formula 4,

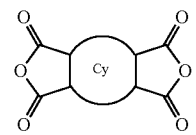

Chemical Formula 11 wherein, in Chemical Formula 11,

Cy is a substituted or unsubstituted $C_4$ to $C_{20}$ carbon cyclic group, a substituted or unsubstituted $C_6$ to $C_{20}$ monocyclic aromatic group, a substituted or unsubstituted 8- to 20-membered condensed polycyclic aromatic group, or a substituted or unsubstituted 10- to 20-membered non-condensed polycyclic aromatic group.

7. The method of claim 6, wherein the amine groups of the amine compounds of Chemical Formula 9 and Chemical Formula 10 and the acid dianhydride group of the acid dianhydride compound are reacted with each other at an equivalent ratio ranging from about 1:0.9 to 1:1.1.

8. The method of claim 6, wherein the amine compounds of Chemical Formulae 9 and 10 are reacted at a mole ratio ranging from about 1:0.001 to 1:0.5.

9. The method of claim 6, wherein the amount of amine group of the amine compound of Chemical Formula 10 is about 0.5 mol % to about 50 mol % based on the total amount of the amine groups of the amine compounds of Chemical Formulae 9 and 10.

10. A composition comprising the polymer according to claim 1.

11. A film comprising the polymer according to claim 1.

* * * * *